May 23, 1939.  W. R. FLEMING  2,159,690
METHOD OF MAKING IRRIGATING TILE
Filed Aug. 17, 1934

Inventor
Walter R. Fleming
By C. F. Headen
Attorney

Patented May 23, 1939

2,159,690

UNITED STATES PATENT OFFICE 2,159,690

METHOD OF MAKING IRRIGATING TILE

Walter R. Fleming, Tulsa, Okla.

Application August 17, 1934, Serial No. 740,305

1 Claim. (Cl. 25—155)

This invention relates to irrigating tile and the method of laying it.

A primary object of the invention is to provide a method of constructing a continuous one-piece porous tile or conduit which may be made and laid in a ditch in one operation, and which will irrigate sloping or rolling land without being laid level.

Another object is to construct such a tile having a lining or tubular core which operates both as a reinforce and as an inside form without affecting the seepage of the water thru the tile.

The invention consists of a conduit composed of porous cement and a reticulated lining tube or core around which the cement is packed and thru some of the interstices of which portions of the cement project while wet and become hardened so that the tube operates not only as an inside form but also as a reinforce and as a control for the seepage of water therethru.

Figure 1:
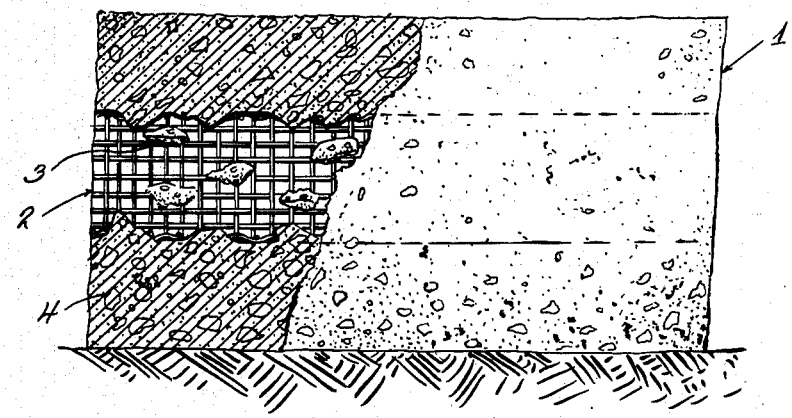
Figure 2:
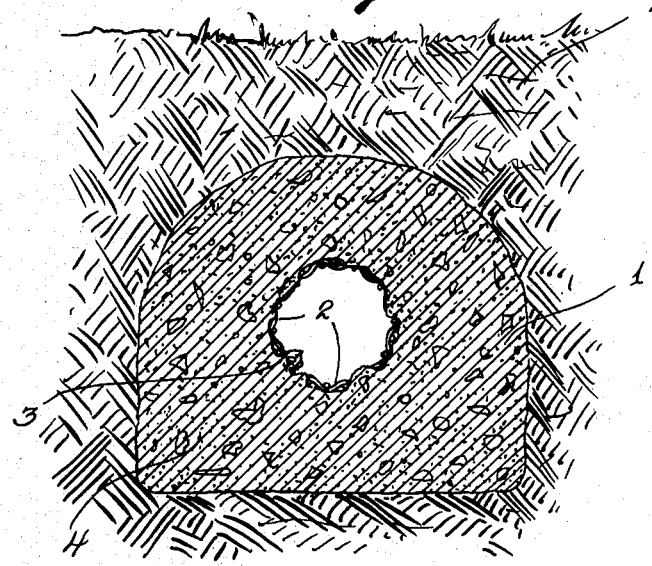

In the accompanying drawing Figure 1 represents a side elevation partly in longitudinal section of a portion of a tile constructed in accordance with this invention; and Fig. 2 is a transverse section thereof with the tile shown embedded in a ditch.

In the embodiment illustrated the continuous porous tile 1 constituting the invention is formed of a comparatively coarse mesh wire tube 2 surrounded or embedded in porous concrete or cement. Obviously wire of any desired mesh may be used according to the desired flow of the water thru the tile, the finer the mesh of the wire and the finer the texture of the cement the slower the flow or seepage of the water thru the tile.

This tubular reticulated core 2 may be of any desired size from one inch in diameter up to several inches and it may be of any desired length and preferably in one piece. The cement or concrete portion 4 of the tile may be made of sand and cement alone, sand and gravel, or sand and crushed rock or chat with cement. It is to be understood that the porosity of the tile as well as the size of the wire mesh controls the passage of the water. It is also to be understood that heavy grade wire is necessary where large tile is to be made.

In forming and laying the tile the reticulated tube 2 is laid in a ditch and the required quantity of the wet cement mixture is poured and packed around the tube. Portions of the wet mixture will enter the interstices of the wire mesh forming interlocking keys 3 and making the tile many times stronger than it would be without it.

The outside form will of course govern the shape of the tile and which may be of any configuration desired.

Since the water cannot leave the tile except thru seepage thru the walls thereof it will when the source of water is higher carry over irregular surfaces and rise to the level of its source, thus making it possible to sub-irrigate land that is not level.

I claim as my invention:

The method of making and simultaneously laying a conduit for irrigation purposes which consists in digging a trench in the soil to be irrigated, spreading a layer of porous cement mixture in the bottom of the trench, placing a reticulated tubular former upon the porous cement layer in the bottom of the trench, placing a quantity of porous cement mixture upon the reticulated tubular former and the said layer of porous cement mixture in the bottom of the trench sufficient to fully surround and enclose the said tubular former, and then filling the trench with soil whereby when the cement hardens the layer of porous cement in the bottom of the trench the reticulated former thereon and the porous cement mixture surrounding and enclosing the reticulated former become united into a single conduit and the entire irrigation line is formed of a single unitary structure to convey the necessary water for irrigation purposes.

WALTER R. FLEMING.